(12) United States Patent
Dieckmann et al.

(10) Patent No.: US 6,199,395 B1
(45) Date of Patent: Mar. 13, 2001

(54) CONDENSATE HANDLING ASSEMBLY AND METHOD

(75) Inventors: John T. Dieckmann, Belmont; Richard C. Williams, Ashland; Robert A. Zogg, Belmont, all of MA (US)

(73) Assignee: Arthur D. Little, Inc., Cambridge, MA (US)

( * ) Notice: Subject to any disclaimer, the term of this patent is extended or adjusted under 35 U.S.C. 154(b) by 0 days.

(21) Appl. No.: 09/385,564

(22) Filed: Aug. 30, 1999

(51) Int. Cl.[7] .............................. F25D 21/00; F25D 21/06
(52) U.S. Cl. ................... 62/272; 62/291; 62/275; 62/285
(58) Field of Search ............................. 62/272, 275, 271, 62/248, 285, 85, 291

(56) References Cited

U.S. PATENT DOCUMENTS

| | | | |
|---|---|---|---|
| 5,113,668 | * | 5/1992 | Wachs, III et al. . |
| 5,327,743 | * | 7/1994 | Coltrin ................................ 62/285 X |
| 5,669,221 | * | 9/1997 | LeBleu et al. ..................... 62/272 X |
| 5,904,053 | * | 5/1999 | Polk et al. .............................. 62/285 |

FOREIGN PATENT DOCUMENTS

406101862 * 4/1994 (JP) .

* cited by examiner

Primary Examiner—William Doerrler
Assistant Examiner—Chen-Wen Jiang
(74) Attorney, Agent, or Firm—Pandiscio & Pandiscio

(57) ABSTRACT

A condensate handling assembly comprises a collection container for receiving and retaining condensate, a heating container for receiving condensate from the collection container, and a heating device for raising the temperature of condensate in the heating container to pressurize condensate in the heating container. A transfer conduit interconnects the collection container and the heating container, and a one-way valve is disposed in the transfer conduit for permitting flow of condensate from the collection container to the heating container. A level sensor senses the level of condensate in the collection container and activates the heating device upon the condensate in the collection container reaching a selected level. A discharge conduit extends from the heating container and is in communication with a selected water reservoir, and a one-way valve is disposed in the discharge conduit for releasing condensate from the heating container for flow to the reservoir upon pressure of the condensate in the heating container exceeding pressure in the reservoir.

14 Claims, 2 Drawing Sheets

CONDENSATE HANDLING ASSEMBLY AND METHOD

BACKGROUND OF THE INVENTION

1. Field of the Invention

The invention relates to the handling of normally undesirable condensate and is directed more particularly to an assembly and method for disposing of condensate to a drain line or potable water system.

2. Description of the Prior Art

Many processes involve the cooling of air, either for the direct purpose of cooling and/or dehumidifying the air, such as in dehumidification, air conditioning, or refrigeration, or as an indirect result of heating using an air-source heat pump, as, for example, heating water using a heat pump water heater. Depending on the temperature and moisture content of the air, and the degree to which it is cooled, some of the moisture in the air being cooled condenses. The condensate formed must then be disposed of. Normally, this is accomplished using a drain line leading to a drain. Draining condensate can, however, be difficult in many applications. For example, there may be no drain conveniently located to which a condensate drain line can be plumbed, or the drain may be situated such that condensate cannot drain by gravity.

In U.S. patent application Ser. No. 09/059,878, filed Apr. 14, 1998, U.S. Pat. No. 5,946,927, in the names of John T. Dieckmann et al, and U.S. patent application Ser. No. 09/111,248, filed Jul. 3, 1998, now U.S. Pat. No. 5,906,109 in the names of John T. Dieckmann et al, there are shown and described heat pump water heater and storage tank assemblies in which disposal of condensate is discussed. The aforesaid applications are incorporated herein by reference. As noted therein, one can design an air-cooling apparatus such that condensate is not formed. This is accomplished by limiting the cooling capacity of the cooling apparatus, either by limiting its maximum cooling capacity, or by shutting off, or lowering, its cooling capacity when conditions are conducive to condensate formation. Either alternative usually imposes unacceptable cooling-capacity limits for air conditioning and refrigeration, and eliminates one of the desired functions of air conditioning, i.e., dehumidification. It also restricts the capacity that can be achieved by a heat pump using practical air-flow rates through an air-cooling coil and completely defeats the purpose for dehumidification applications. Alternatively, one can re-evaporate the condensate that forms. This approach, however, imposes several disadvantages, including a) increased cost and complexity of the apparatus, b) reduced reliability of the apparatus associated with increased design complexity, such as the need for float switches and/or other moving parts, and c) increased energy consumption required to evaporate the condensate. For air-conditioning applications, this counteracts the desired dehumidification function of the air conditioner. For dehumidification applications, this completely defeats the purpose.

Where the drain is located at a higher elevation relative to the air-cooling coil, and gravity will not drain condensate, a condensate pump can be used to pump the condensate to the drain. However, a conventional condensate pump and the associated apparatus tend to be costly and are subject to reliability problems due to the use of moving parts such as a float switch, motor, and mechanical pump There is thus a need for a condensate disposal device and method for use with air-cooling coils, which device heats and pressurizes the condensate and injects the pressurized condensate to a drain line, potable water system or other water reservoir.

There is further a need for a condensate disposal device and method for use with air-cooling coils, which device does not require a conventional condensate pump.

SUMMARY OF THE INVENTION

An object of the invention is, therefore, to provide an assembly and method for handling condensate emanating from an air-cooling and/or dehumidifying, and/or heating apparatus, heating and pressurizing the condensate, and disposing of the condensate in a drain line, potable water system, or other water reservoir (hereinafter "water reservoir").

A further object of the invention is to provide an assembly and method for handling condensate as described immediately above, in which the heating apparatus sterilizes the condensate for disposing of the condensate in a potable water system.

A further object of the invention is to provide an assembly for handling condensate that cannot be directed through gravity to an appropriate drain, the assembly being adapted to pressurize the condensate and inject the condensate under pressure into an appropriate water reservoir.

With the above and other objects in view, as will hereinafter appear, a feature of the present invention is the provision of a condensate handling assembly comprising a collection container for receiving and retaining condensate, a heating container for receiving condensate from the collection container, and a heating device for raising the temperature of condensate in the heating container to pressurize the condensate in the heating container. A transfer conduit interconnects the collection container and the heating container, and a one-way valve is disposed in the transfer conduit for permitting flow of condensate from the collection container to the heating container. A level sensor, pressure sensor, or equivalent (hereinafter, "level sensor"), senses the level of condensate in the collection container and activates the heating device upon the condensate in the collection container reaching a selected level. A discharge conduit extends from the heating container and is in communication with a selected water reservoir, and a one-way valve is disposed in the discharge conduit for releasing condensate from the heating container for flow to the water reservoir upon pressure of the condensate in the heating container exceeding pressure in the water reservoir.

In accordance with a further feature of the invention, there is provided a method for handling condensate, the method comprising the steps of collecting condensate in a collection container, transferring the condensate in the collection container to a heating container until the heating container is filled to a selected level, heating the condensate in the heating container to raise pressure in the heating container, continuing the collection of condensate in the collection container while heating condensate in the heating container, and flowing heated and pressurized condensate from the heating container to a water reservoir having a pressure lower than the pressure in the heating container.

The above and other features of the invention, including various novel details of construction and combinations of parts and method steps, will now be more particularly described with reference to the accompanying drawings and pointed out in the claims. It will be understood that the particular device and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
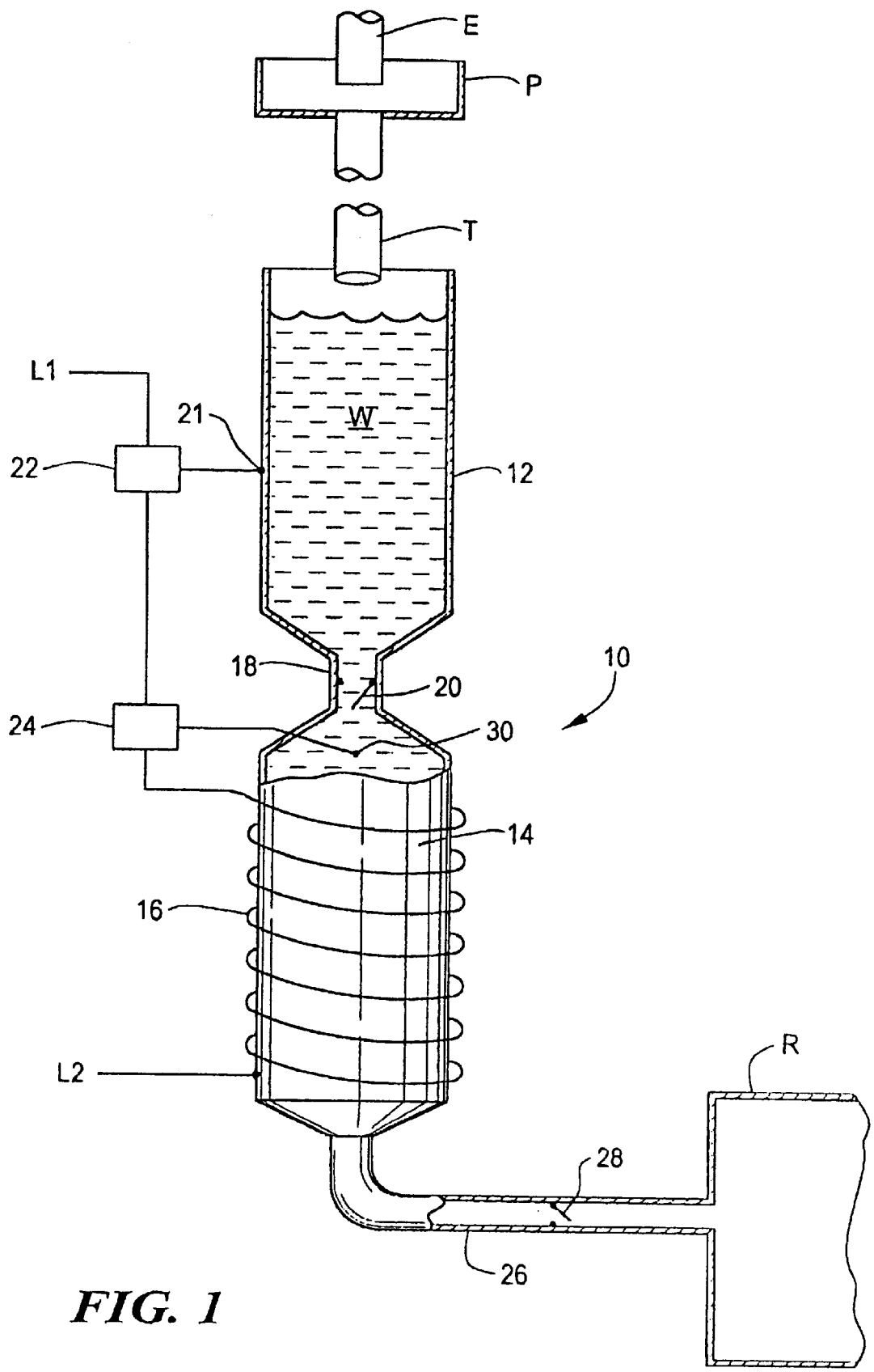
FIG. 1 is a diagrammatic illustration of one form of assembly illustrative of an embodiment of the invention.

Referring to FIG. 1, it will be seen that an illustrative condensate handling assembly 10 includes a collection container 12 for receiving and retaining condensate W, such as condensate from a drain tube T in communication with a condensate pan P of an air-cooling coil E.

The assembly 10 further includes a heating container 14 for receiving condensate from the collection container 12. Associated with the heating container 14 is a heating device 16, such as an electrically resistive coil, for raising the temperature of the condensate in the heating container 14 to pressurize and, if desired, sterilize the condensate in the heating container. Alternatively, the heating device 16 may be any appropriate heat-providing device other than an electrically resistive coil.

A transfer conduit 18 interconnects the collection container 12 and the heating container 14. A one-way valve 20 is disposed in the transfer conduit 18 and permits flow of condensate from the collection container 12 to the heating container 14, but prevents flow in the opposite direction.

The assembly 10 is provided with a level sensor 21, in electrical communication with a power line L1/L2, that senses the level of condensate W in the collection container 12 and, when the condensate in container 12 is at a selected level, level sensor 21 closes a switch 22 in communication with the power line L1/L2 that, in turn, activates the heating device 16.

A discharge conduit 26 extends from the heating container 14 and is in communication with a selected water reservoir R. A one-way valve 28 is disposed in the discharge conduit 26 for releasing condensate from the heating container 14 for flow to the reservoir R, upon pressure of the condensate in the heating container 14 exceeding the pressure in the reservoir R. The valve 28 prevents flow from the reservoir R to the heating container 14.

In operation of the assembly, condensate W passes through the drain tube T, or similar conduit, and drops into the collection container 12, from whence the condensate passes through the transfer conduit 18 and the one-way valve 20, into the heating container 14. Inasmuch as there is no significant pressure in the heating container 14, the one-way valve 20 remains open.

In due course, the heating container 14 and collection container 12 fill with condensate. When the level of condensate in the collection container 12 reaches a selected level, the level sensor 21 closes switch 22 to activate the heating device 16 and heating of the condensate in the heating container 14 begins.

As the condensate in the heating container 14 becomes slightly superheated, or begins to vaporize, the condensate pressurizes the heating container, closing the valve 20. Collection container 12 continues to collect any condensate formed while valve 20 is closed. Once the pressure of the heating container 14 is greater than that of the water reservoir R, the one-way valve 28 opens, allowing the condensate to enter the water reservoir R. This process continues until substantially all of the water is injected into the water reservoir R and only a small amount of vapor remains in the heating container 14.

A temperature sensor 30 in communication with the heating container 14 senses when the condensate in the heating container is at a temperature indicating it is sufficiently pressurized and opens switch 24 to de-activate the heating device 16. When the reservoir R is a potable water system, the temperature required in the heating container is typically about 350° F., depending on the pressure of the potable water system. When the reservoir R is a drain line, the temperature required in the heating container is typically about 250° F., depending on the pressure in the drain line. The residual vapor (typically less than 0.3 percent relative to the mass originally in the heating container) begins to condense and the pressure within the heating container 14 begins to drop. Once the pressure of the heating container 14 has dropped below the pressure in the collection container 12, the valve 20 opens, the condensate in the collection container 12 begins to fill the heating container 14, and the process is repeated.

Figure 2:
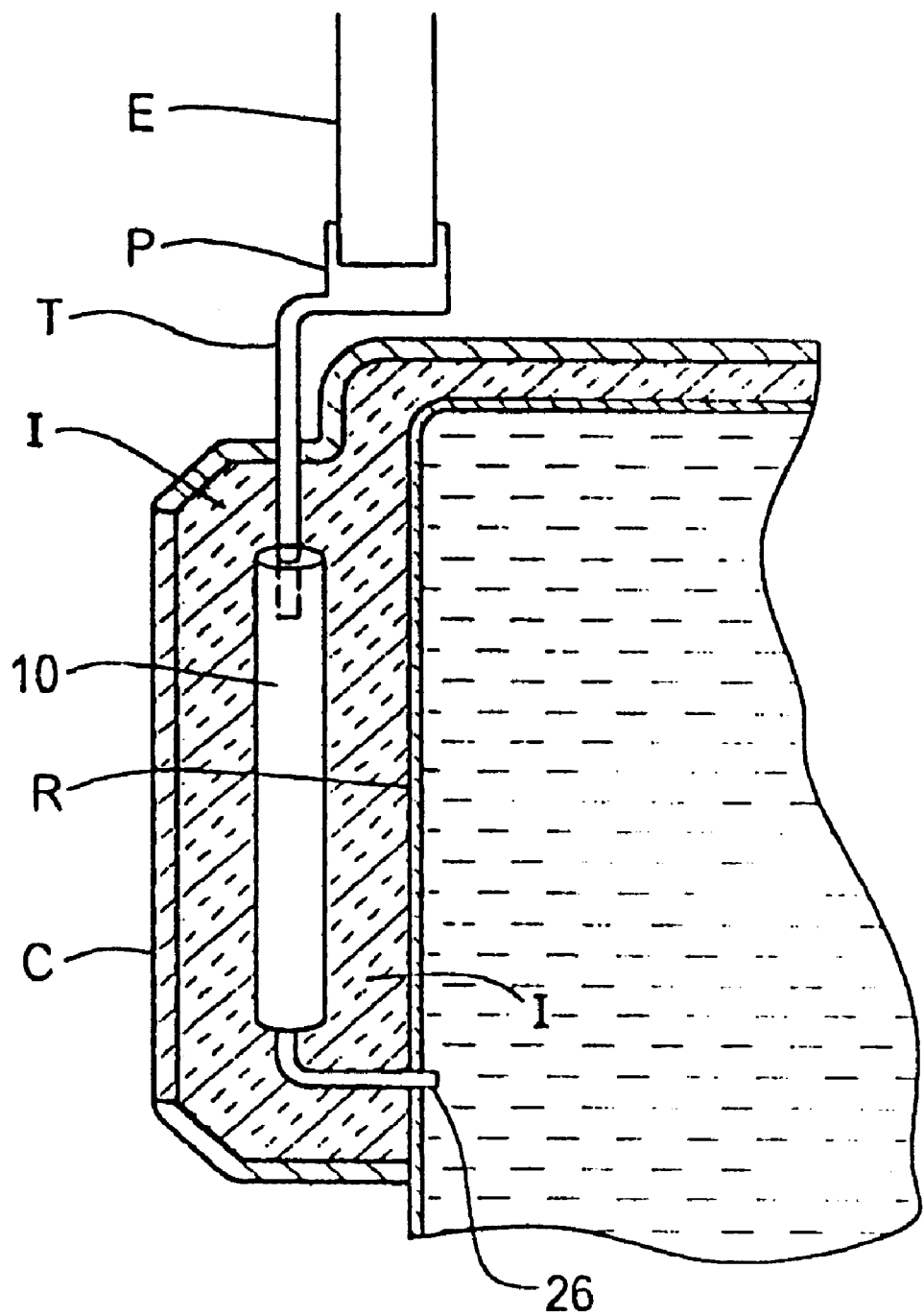
FIG. 2 is a diagrammatic illustration of one example of an installation of the assembly of FIG. 1.

In FIG. 2, there is illustrated diagrammatically the above-described assembly shown in conjunction with a water heater of the type shown and described in the aforementioned patent applications. In this instance, the reservoir R constitutes a tank for storage of potable hot water. An air-cooling coil E is provided with the condensate pan P, which drains into the drain tube T and, thence, into the assembly 10, which includes the containers 12 and 14, described above, and which injects sterilized condensate into the hot water tank.

As illustrated in FIG. 2, the assembly 10 may be embedded in insulation I on the side of the hot water tank R. A removable cover panel C may be provided for access to the assembly.

There is thus provided an assembly and method for handling condensate from a condensate-producing apparatus, including collecting the condensate, heating and pressurizing the condensate, and injecting the condensate into a potable water tank, or into a drain line, or other water reservoir.

It will be understood that many additional changes in the details, materials, steps and arrangement of parts and steps, which have been herein described and illustrated in order to explain the nature of the invention, may be made by those skilled in the art within the principles and scope of the invention as expressed in the appended claims.

What is claimed is:

1. A condensate handling assembly comprising:
    a collection container for receiving and retaining condensate;
    a heating container for receiving condensate from said collection container;
    a heating device for raising the temperature of condensate in said heating container to pressurize the condensate in said heating container;
    a transfer conduit interconnecting said collection container and said heating container;
    a one-way valve disposed in said transfer conduit for permitting flow of condensate from said collection container to said heating container;

a level sensor for sensing the level of condensate in said collection container and for activating said heating device upon the condensate in said collection container reaching a selected level;

a discharge conduit extending from said heating container and in communication with a selected water reservoir; and a one-way valve disposed in said discharge conduit for releasing condensate from said heating container for flow to said reservoir upon pressure of said condensate in said heating container exceeding pressure in said reservoir.

2. The assembly in accordance with claim 1, and further comprising a switch in electrical communication with said level sensor and said heating device, said level sensor being adapted to activate said switch, and said switch being adapted to activate said heating device.

3. The assembly in accordance with claim 2, and further comprising a temperature sensor mounted in said heating container and in communication with said switch to deactivate said heating device upon sensing a selected temperature.

4. The assembly in accordance with claim 3 wherein the selected temperature at which said switch deactivates said heating device is about 250° F.

5. The assembly in accordance with claim 1 wherein said heating device comprises an electrical resistance heating device.

6. The assembly in accordance with claim 5 wherein said heating device is wound around said heating container.

7. The assembly in accordance with claim 1 wherein said assembly further comprises a tube for flowing condensate into said collection container.

8. The assembly in accordance with claim 7 wherein said assembly is mounted proximate a hot water tank, and said tube is in communication with an evaporator condensate pan associated with said hot water tank.

9. The assembly in accordance with claim 7 wherein said heating container is disposed below said collection container so as to receive flow through said transfer conduit by gravity.

10. The assembly in accordance with claim 9 wherein said collection container is disposed below said tube so as to receive condensate from said tube by gravity.

11. The assembly in accordance with claim 1 wherein said heating device is adapted to raise the temperature of condensate in said heating container to sterilize the condensate in said heating container.

12. The assembly in accordance with claim 11 wherein the selected temperature at which said switch deactivates said heating device is about 350° F.

13. The assembly in accordance with claim 1 wherein said heating device is adapted to raise the temperature of condensate in said heating container to about 250° F.

14. A condensate handling assembly comprising:

a collection container disposed at a lower level than a condensate conduit and adapted to receive condensate from the conduit by gravity;

a heating container disposed at a lower level than said collection container and adapted to receive condensate from said collection container by gravity;

a heating device for raising the temperature of condensate in said heating container to pressurize condensate in said heating container, to increase pressure in said heating container;

a transfer conduit interconnecting said collection container and said heating container;

a one-way valve disposed in said transfer conduit for permitting flow of condensate by gravity from said collection container to said heating container;

a level sensor for sensing the level of condensate in said collection container and for activating said heating device upon the condensate in the collection container reaching a selected level;

a discharge conduit extending from said heating container and in communication with a selected water reservoir; and a one-way valve disposed in said discharge conduit for releasing condensate from said heating container for injecting into said reservoir upon pressure of the condensate in said heating container exceeding pressure in said reservoir.

\* \* \* \* \*